United States Patent [19]
Sugiyama et al.

[11] 3,864,624
[45] Feb. 4, 1975

[54] STANDARD VOLTAGE GENERATING CIRCUIT

[75] Inventors: Takashi Sugiyama; Minoru Odajima; Yoshiro Tamezumi, all of Tokyo, Japan

[73] Assignee: Yokogawa Electric Works, Ltd., Tokyo, Japan

[22] Filed: May 24, 1973

[21] Appl. No.: 363,477

[30] Foreign Application Priority Data
May 31, 1972 Japan.............................. 47-53924
May 31, 1972 Japan.............................. 47-53925

[52] U.S. Cl.................... 323/19, 323/40, 330/30 D, 330/104
[51] Int. Cl............................ G05f 1/56, H03f 1/14
[58] Field of Search......... 330/24, 28, 30 D, 82, 85, 330/103, 110, 104; 323/16, 19, 22 T, 40

[56] References Cited
UNITED STATES PATENTS
3,436,673  4/1969  Fricke, Jr...................... 330/104 X
3,451,006  6/1969  Grangaard, Jr.................. 330/28 X
3,584,233  6/1971  Cath et al..................... 330/30 D X
3,737,798  6/1973  Faraguet et al.................. 330/85

*Primary Examiner*—Gerald Goldberg
*Attorney, Agent, or Firm*—Bryan, Parmelee, Johnson & Bollinger

[57] ABSTRACT

A circuit for generating a highly stable and accurate standard DC voltage is formed with an operational amplifier arranged to have both a constant gain negative feedback circuit and a positive feedback circuit. The positive feedback circuit includes the source-drain circuit of a field effect transistor and is arranged to drive the field effect transistor into its pinch off region of operation to limit the current therethrough to a predetermined stable level to produce a stable DC output voltage at the output of the operational amplifier.

19 Claims, 3 Drawing Figures

PATENTED FEB 4 1975

3,864,624

STANDARD VOLTAGE GENERATING CIRCUIT

BACKGROUND OF THE INVENTION

1. FIELD OF THE INVENTION

This invention relates to circuits of the type designed to generate standard DC voltages, such as are used to supply precision measuring or sensing devices, and relates more particularly to attainment of highly stable and accurate voltages in such circuits.

2. DESCRIPTION OF THE PRIOR ART

Various arrangements have been proposed for generating standard DC voltages. Generally, these arrangements make use of a zener diode as a voltage reference element and are constructed in such a way that the standard voltage characteristics depend upon the characteristics of the zener diode. Stability and accuracy in generating a standard DC voltage thus hinge upon the existence of a stable and accurate zener diode.

For voltage stabilizing applications requiring high accuracy, for example, on the order of several PPM (parts per million) the zener diodes available at present are unsatisfactory. Zener diode characteristics change considerably with age and, in addition, different individual zener diodes do not age uniformly.

SUMMARY OF THE INVENTION

It is a principal object of this invention to provide an improved circuit for generating a standard DC voltage. It is a specific object of the invention to provide a standard DC voltage generating circuit which is highly accurate and stable and does not rely upon use of a zener diode as a voltage reference element. Still another object of the invention is to provide a standard DC voltage generating circuit which is more suitable for commercial use.

In a preferred embodiment of the invention to be described hereinbelow in detail, the circuit for generating the standard DC voltage is formed with an operational amplifier arranged to have a constant gain negative feedback circuit and a positive feedback circuit having means, preferably a field effect transistor, for limiting the current through the positive feedback circuit to a predetermined stable level to produce a stable DC output voltage at the output of the operational amplifier. This arrangement affords highly stable and accurate operation with economy because the DC output voltage is dependent only upon resistors, available in highly precise and stable form, and upon the current limiting conductance characteristics of field effect transistors, available with a stability and uniformity more economically attainable than are comparable characteristics in zener diodes.

Other objects, aspects and advantages of the invention will be pointed out in, or be apparent from, the detailed description hereinbelow, considered together with the following drawings.

DESCRIPTION OF THE PREFERRED EMBODIMENT

Figure 1:
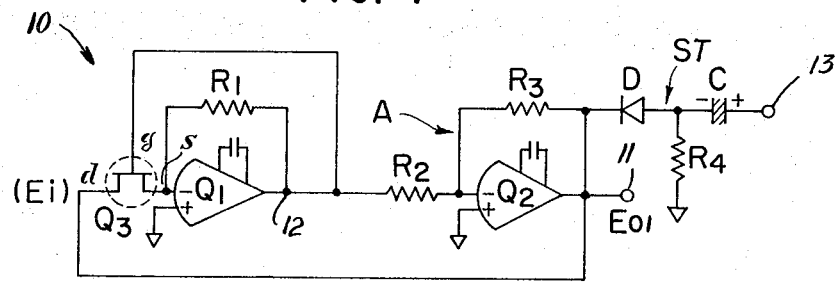
FIG. 1 is a schematic diagram showing one form of the improved standard DC voltage generating circuit.

FIG. 1 illustrates a standard DC voltage generating circuit 10 arranged according to the invention to supply at an output terminal 11 a highly stable and accurate DC voltage Eo1. Voltage generating circuit 10 comprises an operational amplifier Q1 with an inverting (−) input terminal, a grounded noninverting (+) input terminal, and an output terminal 12. Between the output terminal 12 and the inverting input terminal, a constant gain negative feedback circuit is formed by resistor R1, and a positive feedback circuit is formed by a constant gain inverting amplifier A in series with a depletion type field effect transistor (or FET) Q3.

As shown in FIG. 1, the constant gain inverting amplifier A comprises an operational amplifier Q2 having an input resistor R2 and a negative feedback resistor R3. The output voltage of operational amplifier Q2 is applied to output terminal 11 as output voltage Eo1 and is also applied to the drain terminal $d$ of field effect transistor Q3 which has its source terminal $s$ connected to the inverting input terminal of operational amplifier Q1. The resistance between the drain and the source of FET Q3 thus serves as an input resistance to operational amplifier Q1 for the voltage Eo1. The gate terminal $g$ of Q3 is connected to the output of operational amplifier Q1 and hence the voltage developed across resistor R1 acts as a gate to source bias voltage for Q3. The gain of the positive feedback circuit through amplifier A and FET Q3 is arranged to be greater than 1 when FET Q3 is operated in the ohmic region, (i.e., at levels below those causing the FET Q3 to operate in the pinch off region of operation in which it conducts a constant current irrespective of the voltage thereacross and thus functions as a current limiter).

A starting voltage is applied to terminal 11 by a starting circuit ST comprising an input terminal 13, a differentiating circuit formed by a capacitor C and a resistor R4 in series, and a coupling diode D connecting the junction of capacitor C and resistor R4 to terminal 11. Input terminal 13 of starting circuit ST is connected to a DC power voltage source (not shown) which is also connected to the power input terminals of operational amplifiers Q1 and Q2. For explanatory simplicity, connections from the DC power voltage source to these amplifiers are not depicted in FIG. 1. When the DC power voltage source is turned on, a step waveform is applied to terminal 13. The starting circuit ST converts this step voltage to a positive starting voltage having a spike waveform and applies the starting voltage through coupling diode D to terminal 11. The starting voltage at terminal 11 is applied to drain terminal $d$ of FET Q3 which causes FET Q3 to supply a current signal to operational amplifier Q1. Amplifier Q1, made operative when the DC power voltage source is turned on, produces a negative voltage at its output terminal 12 proportional to the current flowing through FET Q3. The negative output voltage at terminal 12 of operational amplifier Q1 is amplified and inverted by amplifier circuit A and positively fed back to the drain of FET Q3. Since the gain of the positive feedback circuit including amplifier A and FET Q3 is larger than 1 while FET Q3 is in its ohmic region of operation, the output voltage Eo1 increases due to the positive feedback. When the output voltage Eo1 exceeds the pinch off voltage of FET Q3, the current flowing through FET Q3 saturates and becomes constant. The output voltage at terminal 12 of operational amplifier Q1 stabilizes and, accordingly, the output voltage Eo1 of amplifier A stabilizes. The amount of constant current flowing through FET Q3 after pinch off depends on the output voltage of operational amplifier Q1 because that voltage determines the gate to source bias voltage applied across resistor R1.

Figure 3:
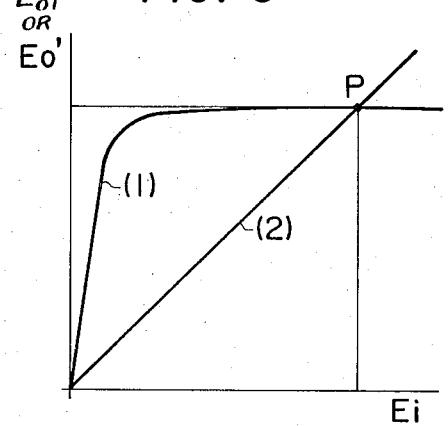
FIG. 3 is a graph illustrating characteristics of operation of the improved circuit.

Operation of voltage generating circuit 10 can be explained by the following analysis. If the positive feedback circuit were to be interrupted by removing the connection between terminal 11 and drain $d$ of transistor Q3, then an input voltage Ei applied to the drain $d$ would produce an output voltage Eo1 related thereto according to curve 1 shown in FIG. 3. Curve 1 indicates that the output voltage Eo1 sharply increases at first as the input voltage Ei increases and then levels off to become constant. The sharp increase corresponds to operation of FET Q3 in the ohmic region below pinch off, and the constant level corresponds to operation after attaining pinch off. The existence of a closed positive feedback loop as in FIG. 1 adds to a circuit having these characteristics the further constraint that the output voltage Eo1 equals the input voltage E$i$, as indicated by the straight line curve 2 in FIG. 3. The output voltage Eo1 must satisfy the two curves simultaneously, which is possible only at the intersection P of the two curves. Hence, output voltage Eo1 is stable at intersection P. The two curves also intersect at the origin, but the starting voltage spike supplied by starting circuit ST prevents the circuit from operating at this point.

In voltage generating circuit 10, the output voltage Eo1 depends not upon zener characteristics as in conventional devices, but rather upon the mutual conductance of FET Q3 and upon the resistance of resistors R1, R2 and R3. Generally speaking, field effect transistors having highly stable mutual conductances are more economically available than zener diodes with highly stable zener characteristics. Further, highly stable, precision resistors are readily obtainable for R1, R2 and R3. This makes it possible to realize a highly stable precision standard voltage generating circuit.

Figure 2:
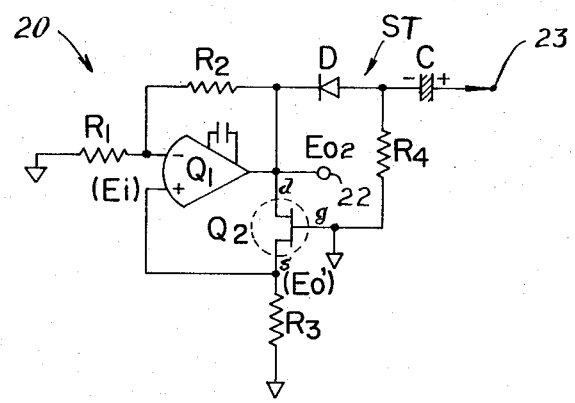
FIG. 2 is a schematic diagram showing another form of the improved circuit.

FIG. 2 illustrates another voltage generating circuit 20 arranged according to the invention to develop at an output terminal 22 a highly stable and accurate DC voltage Eo2. Voltage generating circuit 20 comprises a differential type operational amplifier Q1 having inverting and noninverting input terminals indicated respectively by minus and plus signs, and an output at terminal 22. A constant gain negative feedback circuit is formed by resistors R1 and R2 connected between output terminal 22 and ground, and having their junction connected to the inverting input of operational amplifier Q1. The resistors R1 and R2 divide the output voltage of operational amplifier Q1 and thus provide a negative feedback voltage. A positive feedback circuit is formed by a depletion type FET Q2 connected in series with resistors R3 to form a voltage dividing circuit, the transistor Q2 and resistor R3 being connected at their junction to the noninverting input of operational amplifier Q1. The FET Q2 has its drain $d$ connected to the output terminal 22, its source $s$ connected to resistor R3, and its gate $g$ grounded so that the gate to source bias voltage is the voltage across resistor R3.

A starting voltage is applied to output terminal 22 by a starting circuit ST having capacitor C, resistor R4, and diode D arranged as in FIG. 1. The input terminal 23 to starting circuit ST is connected to a DC power voltage source (not shown) which is also connected to the power input terminals of operational amplifier Q1.

When the DC power source is turned on, the starting circuit ST converts the resulting step voltage to a starting voltage having a spike waveform, and applies this starting voltage to output terminal 22. The starting voltage is divided by resistors R1 and R2 and applied to the inverting input terminal of operational amplifier Q1. At the same time, the starting voltage causes a current to flow through FET Q2 and resistor R3. The voltage drop across resistor R3 is applied to the noninverting input terminal of operational amplifier Q1. The circuit is arranged so that the voltage drop across resistor R3 is larger than the voltage divided through resistors R1 and R2 while FET Q2 operates in its ohmic region below pinch off. As a result, operational amplifier Q1 produces a positive output voltage Eo2, which is positively and negatively fed back respectively through the voltage divider circuit formed by resistors R1 and R2, and through the voltage divider circuit formed by FET Q2 and resistor R3. Because the amount of positive feedback is larger than the amount of negative feedback, the output voltage Eo2 increases until FET Q2 reaches its pinch off region of operation and the current flowing through FET Q2 saturates and becomes constant. As this occurs, the voltage drop across resistor R3 becomes constant and stabilizes the input voltage to the noninverting input terminal of operational amplifier Q1. Thus the output voltage Eo2 of operational amplifier Q1 is kept constant at a value given by:

$$Eo2 = Ei\ (R1 + R2)/R1$$

where E$i$ is the input voltage to the noninverting input terminal of operational amplifier Q1.

The constant current flowing through FET Q2 at pinch off is determined by its gate to source bias voltage, which depends on the self biasing voltage supplied by resistor R3.

Operation of voltage generating circuit 20 can be explained as follows. Assuming that the positive feedback circuit is interrupted by disconnecting the noninverting input terminal of operational amplifier Q1 from resistor R3, then the input voltage Ei applied to the noninverting input terminal is related to the voltage Eo' developed across resistor R3 by curve 1 shown in FIG. 3. The voltage Eo' sharply increases as the input voltage E$i$ increases and then levels off to a constant value. The sharp increase occurs while FET Q2 is in its ohmic region below pinch off, and the leveling off occurs as pinch off is reached. Restoring the positive feedback connection between the noninverting input terminal of operational amplifier Q1 and resistor R3 places the additional constraint on the circuit that $Ei = Eo'$, as indicated by the straight line curve 2 in FIG. 3. Since voltage Eo' must satisfy curves 1 and 2 simultaneously, the voltage Eo' is stable at the intersection P. With the voltage Eo' stabilized, the output voltage Eo2 of operational amplifier Q1 is accordingly stabilized at a value of:

$$Eo2 = Eo'\ (R1 + R2)/R1.$$

Although specific embodiments of the invention have been disclosed herein in detail, it is to be understood that this is for the purpose of illustrating the invention, and should not be construed as necessarily limiting the scope of the invention, since it is apparent that many

We claim:

1. A circuit for generating a highly stable and accurate standard DC voltage comprising:
   an operational amplifier having an input and an output;
   a negative feedback circuit between the operational amplifier output and input and having a constant gain;
   a positive feedback circuit extending between the operational amplifier output and input; and
   means in the positive feedback circuit for limiting the current passing therethrough to the operational amplifier input to a constant stable level, the current limiting means having a condition of operation in which current remains constant despite variations in voltage thereacross, the current limiting means being arranged to operate in said constant current condition at said stable current level;
   thereby to produce a stable DC output voltage at the output of the operational amplifier.

2. A circuit for generating a highly stable and accurate standard DC voltage as claimed in claim 1 wherein said current limiting means comprises a field effect transistor connected in the positive feedback circuit through its source and drain terminals with current therethrough being limited upon attainment of the pinch off region of operation of the transistor.

3. A circuit for generating a highly stable and accurate standard DC voltage as claimed in claim 2 wherein said field effect transistor has its gate connected to its source through a resistor developing a stable level of bias voltage.

4. A circuit for generating a highly stable and accurate standard DC voltage as claimed in claim 1 further comprising means for supplying a starting signal to the positive feedback circuit to initiate positive feedback operation of the operational amplifier.

5. A circuit for generating a highly stable and accurate standard DC voltage as claimed in claim 4 wherein said means for supplying a starting signal comprises a differentiating circuit coupled to the positive feedback circuit through diode means.

6. A circuit for generating a highly stable and accurate standard DC voltage as claimed in claim 1 wherein the positive feedback circuit comprises a constant gain inverting amplifier connected to the output of the operational amplifier, and wherein the current limiting means comprises a field effect transistor connected through its source and drain terminals between the output of the constant gain inverting amplifier and the input of the operational amplifier.

7. A circuit for generating a highly stable and accurate standard DC voltage as claimed in claim 6 wherein the field effect transistor has its gate connected to the output of the operational amplifier and wherein the negative feedback circuit comprises a resistor between the operational amplifier output and input, the voltage across said resistor being applied as a bias voltage between the source and gate terminals of the field effect transistor.

8. A circuit for generating a highly stable and accurate DC voltage as claimed in claim 6 further comprising means for supplying a starting signal to the positive feedback circuit at the output of the constant gain amplifier.

9. A circuit for generating a highly stable and accurate standard DC voltage as claimed in claim 8 wherein the means for generating a starting signal comprises a differentiating circuit connected to the positive feedback circuit through diode means.

10. A circuit for generating a highly stable and accurate standard DC voltage as claimed in claim 1 wherein the operational amplifier is of the differential type having an input including inverting and non inverting terminals, and wherein the positive feedback circuit is connected between the operational amplifier output and the non inverting input terminal, the current limiting means comprising a field effect transistor connected through its source and drain in series with a resistor to form a voltage divider, the voltage across said resistor being applied to the non inverting input terminal of the operational amplifier.

11. A circuit for generating a highly stable and accurate standard DC voltage as claimed in claim 10 wherein the field effect transistor has its gate terminal connected to receive the voltage developed across said resistor between its source and gate terminals as a bias voltage.

12. A circuit for generating a highly stable and accurate standard DC voltage as claimed in claim 10 further comprising means for supplying a starting signal to the positive feedback circuit at the output of said operational amplifier to initiate positive feedback operation of said operational amplifier.

13. A circuit for generating a highly stable and accurate standard DC voltage as claimed in claim 12 wherein said means for supplying a starting signal comprises a differentiating circuit connected to said positive feedback circuit through diode means.

14. A circuit for generating a highly stable and accurate standard DC voltage comprising:
   an operational amplifier having an input and an output;
   a negative feedback circuit extending from the operational amplifier output to input and having a constant gain, said negative feedback circuit including a resistor;
   a positive feedback circuit extending from the operational amplifier output to input and including a constant gain inverting amplifier connected to the operational amplifier output and a field effect transistor connected through its source and drain terminals between the output of the constant gain inverting amplifier and the operational amplifier input and having its gate connected to its source through a resistor developing a stable level of bias voltage; and
   means for applying a starting signal to the positive feedback circuit at the output of said constant gain inverting amplifier to initiate positive feedback in the operational amplifier and to increase the current flowing through the field effect transistor thereby to cause said field effect transistor to become operated in its pinch-off region of operation with a predetermined stable level of current therethrough.

15. A circuit for generating a stable standard DC voltage as claimed in claim 14 wherein said operational amplifier and constant gain inverting amplifier are energized by a source of DC power voltage, and wherein said differentiating circuit has a terminal for connection to the source of DC power voltage.

16. A circuit for generating a highly stable and accurate standard DC voltage as claimed in claim 14 wherein said field effect transistor has its gate connected to the output of the operational amplifier.

17. A circuit for generating a highly stable and accurate standard DC voltage comprising an operational amplifier having an inverting input, a non-inverting input, and an output;

a negative feedback circuit including a resistor extending between the operational amplifier output and its inverting input and having a constant gain;

a positive feedback circuit extending between the operational amplifier output and its noninverting input and having a field effect transistor connected in series with a resistor to form a voltage divider, the field effect transistor having its gate connected to its source through means developing a stable level of bias voltage, the voltage across the resistor being applied to the noninverting input of the operational amplifier; and means for supplying a starting signal to the positive feedback circuit to initiate positive feedback therein and to increase the current flowing through the field effect transistor thereby to cause said field effect transistor to become operated in its pinch off region of operation with a predetermined stable level of current therethrough.

18. A circuit for generating a highly stable and accurate standard DC voltage as claimed in claim 14 wherein said negative feedback circuit comprises a resistive voltage divider.

19. A circuit for generating a highly stable and accurate standard DC voltage comprising a differential type operational amplifier having an inverting input, a noninverting input, and an output;

a first voltage divider connected to the output of the operational amplifier and comprising a field effect transistor connected through its source and drain terminals in series with a resistor and with its gate connected to its source through means developing a stable level of bias voltage, the junction of the field effect transistor and the resistor being connected to the noninverting input terminal of the operational amplifier; and a second voltage divider connected to the output of the operational amplifier and comprising two resistors in series, the junction of said resistors being connected to the inverting input of said operational amplifier.

* * * * *